US009584600B2

(12) United States Patent
Yun

(10) Patent No.: US 9,584,600 B2
(45) Date of Patent: Feb. 28, 2017

(54) METHOD OF COMMUNICATION BETWEEN CONSTRUCTION EQUIPMENT AND MANAGEMENT SERVER

(71) Applicant: DOOSAN INFRA-CORE CO., LTD., Incheon (KR)

(72) Inventor: Gi Jung Yun, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 149 days.

(21) Appl. No.: 14/374,806

(22) PCT Filed: Jan. 29, 2013

(86) PCT No.: PCT/KR2013/000687
§ 371 (c)(1),
(2) Date: Jul. 25, 2014

(87) PCT Pub. No.: WO2013/115537
PCT Pub. Date: Aug. 8, 2013

(65) Prior Publication Data
US 2015/0312347 A1 Oct. 29, 2015

(30) Foreign Application Priority Data
Jan. 30, 2012 (KR) ........................ 10-2012-0008723

(51) Int. Cl.
*G06F 15/16* (2006.01)
*H04L 29/08* (2006.01)
(Continued)

(52) U.S. Cl.
CPC ........... *H04L 67/12* (2013.01); *G06Q 20/145* (2013.01); *H04L 12/145* (2013.01); *H04L 41/00* (2013.01);
(Continued)

(58) Field of Classification Search
CPC ........................ B60R 2021/0104–2021/01197; H04L 67/025; H04L 67/12; H04L 67/125;
(Continued)

(56) References Cited

U.S. PATENT DOCUMENTS 6,400,946 B1 * 6/2002 Vazvan .............. H04B 7/18556
455/428
6,446,132 B1 * 9/2002 Kikuchi ................. H04L 45/00
455/445
(Continued)

FOREIGN PATENT DOCUMENTS

CN 102265638 A 11/2011
KR 10-2004-0062829 7/2004
(Continued)

OTHER PUBLICATIONS

Search Report dated May 15, 2013 and written in Korean with English translation for International Patent Application No. PCT/KR2013/000687 filed Jan. 29, 2013, 5 pages.
(Continued)

*Primary Examiner* — Brendan Higa
(74) *Attorney, Agent, or Firm* — John D. Veldhuis-Kroeze; Westman, Champlin & Koehler, P.A.

(57) ABSTRACT

A communication method between construction equipment and a management server according to the present disclosure includes: receiving, by a diagnostic device of the construction equipment, state information from a plurality of vehicle control devices; checking, by the diagnostic device, a usable communication method when the received state information needs to be transmitted to a management server; when there is one usable communication method, transmitting, by the diagnostic device, the state information to the management server by using the corresponding communication method; and when there is a plurality of usable communication methods, selecting, by the diagnostic device, a communication method having the lowest fee per unit data, and transmitting the state information to the management server by using the selected communication method.

5 Claims, 3 Drawing Sheets

(51) Int. Cl.
*H04L 12/24* (2006.01)
*G06Q 20/14* (2012.01)
*H04L 12/26* (2006.01)
*H04W 4/00* (2009.01)
*H04W 4/04* (2009.01)
*H04L 12/14* (2006.01)
*H04W 24/02* (2009.01)
*H04W 24/08* (2009.01)

(52) U.S. Cl.
CPC .............. *H04L 43/50* (2013.01); *H04L 67/10* (2013.01); *H04W 4/001* (2013.01); *H04W 4/046* (2013.01); *H04W 24/02* (2013.01); *H04W 24/08* (2013.01)

(58) Field of Classification Search
CPC . H04L 2012/40267; H04L 2012/40273; H04L 12/14–12/1496
See application file for complete search history.

(56) References Cited

U.S. PATENT DOCUMENTS

| | | | | |
|---|---|---|---|---|
| 8,244,293 | B2* | 8/2012 | Kim | H04W 48/18 455/550.1 |
| 8,606,314 | B2* | 12/2013 | Barnes, Jr. | G06Q 10/1053 370/338 |
| 2002/0177476 | A1* | 11/2002 | Chou | G01S 5/0027 455/574 |
| 2003/0009353 | A1* | 1/2003 | Grimminger | G06Q 30/0283 705/400 |
| 2003/0114965 | A1* | 6/2003 | Fiechter | G06F 11/2263 701/29.3 |
| 2004/0255044 | A1* | 12/2004 | Bergek | H04L 12/5692 709/238 |
| 2008/0205283 | A1* | 8/2008 | McGuffin | H04B 7/18506 370/238 |
| 2008/0298450 | A1 | 12/2008 | Zhang et al. | |
| 2010/0145814 | A1* | 6/2010 | Meghani | G06Q 30/0283 705/26.1 |
| 2010/0226254 | A1* | 9/2010 | Kerr | G06Q 10/04 370/238 |
| 2013/0225122 | A1* | 8/2013 | Kahn | H04L 12/1407 455/406 |
| 2015/0244588 | A1 | 8/2015 | Kim | |

FOREIGN PATENT DOCUMENTS

| | | |
|---|---|---|
| KR | 10-2005-0049598 | 5/2005 |
| KR | 10-2010-0074536 | 7/2010 |
| KR | 10-2011-0040345 | 4/2011 |
| WO | 2011046321 A2 | 4/2011 |

OTHER PUBLICATIONS

Chinese Office Action dated Sep. 26, 2016 for Chinese Application No. 201380009622.4, 2 pages.

* cited by examiner

METHOD OF COMMUNICATION BETWEEN CONSTRUCTION EQUIPMENT AND MANAGEMENT SERVER

CROSS-REFERENCE TO RELATED APPLICATION

This application is a Section 371 National Stage application of International Application No. PCT/KR2013/000687, filed Jan. 29, 2013 and published, not in English, as WO 2013/115537 on Aug. 8, 2013.

FIELD OF THE DISCLOSURE

The present disclosure relates to a communication method between construction equipment and a management server, and more particularly, to a communication method between construction equipment and a management server, which is capable of transmitting state information on the construction equipment by selecting the cheapest communication method when transmitting the state information on the construction equipment to the management server.

BACKGROUND OF THE DISCLOSURE

In general, in a remote management system of construction equipment, construction equipment, such as an excavator and a wheel loader, includes a communication module connected with a vehicle control device, and transmit information on the construction equipment to a management server through a mobile communication network or a satellite communication network, and the management server stores and manages the information on the construction equipment.

When information on the construction equipment is transmitted to the management server, data transmission cost is incurred. In order to decrease the data transmission cost, a method of transmitting information on the construction equipment to a surrounding communication terminal has also been developed. However, the method also finally incurs communication cost when the communication terminal needs to transmit information on the construction equipment to the management server again.

Since construction equipment in the related art uses a predetermined communication method, the construction equipment has no choice but to transmit data only through a fixed communication method even though a surrounding communication environment has changed. Accordingly, a communication method between construction equipment and a management server, which is capable of adaptably changing a communication method according to a communication environment by considering communication cost has been urgently demanded.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure is conceived by the aforementioned necessity, and an object of some exemplary embodiments of the present disclosure is to provide a communication method between construction equipment and a management server, by which the construction equipment is capable of adaptively changing a data communication method according to a communication environment by considering communication cost.

Another object of some exemplary embodiments of the present disclosure is to provide a communication method between construction equipment and a management server, by which the construction equipment is capable of remotely managing the construction equipment with minimum cost by actively selecting a communication method having the lowest communication cost and transmitting information on the construction equipment by using the selected communication method.

To this end, a communication method between construction equipment and a management server according to an exemplary embodiment of the present disclosure includes: receiving, by a diagnostic device of the construction equipment, state information from a plurality of vehicle control devices; checking, by the diagnostic device, a usable communication method when the received state information needs to be transmitted to a management server; when there is one usable communication method, transmitting, by the diagnostic device, the state information to the management server by using the corresponding communication method; and when there is a plurality of usable communication methods, selecting, by the diagnostic device, a communication method having the lowest fee per unit data, and transmitting the state information to the management server by using the selected communication method.

Further, a communication method between construction equipment and a management server according to another exemplary embodiment of the present disclosure includes: transmitting, by a diagnostic device of the construction equipment, current location information on the construction equipment to a management server, and requesting a check of a first mobile communication fee which is a fee per unit data when the diagnostic device uses the mobile communication module; searching for, by the diagnostic device, a surrounding communication terminal, and requesting a check of a second mobile communication fee, which is a fee per unit data when the corresponding communication terminal is used, from the searched communication terminal; selecting, by the diagnostic device, a communication method having the lowest communication fee among the first mobile communication fee, the second mobile communication fee, and a pre-stored satellite communication fee; and transmitting, by the diagnostic device, state information on the construction equipment by using the selected method.

Further, a diagnostic device of construction equipment according to yet another exemplary embodiment of the present disclosure includes: a CAN interface configured to perform CAN communication with a plurality of vehicle control devices included in the construction equipment; a GPS module configured to provide location information on the construction equipment; a communication module including a near field communication module, a mobile communication module, and a satellite communication module configured to transmit state information on the vehicle control devices to a surrounding communication terminal or a management server; a memory configured to store the state information received from the plurality of vehicle control devices, and a satellite communication fee when the satellite communication module is used; and a controller configured to request the state information from the plurality of vehicle control devices, receive the state information, and transmit the received state information to the communication terminal or the management server, in which the controller requests a check of a first mobile communication fee when the mobile communication module is used by transmitting current location information on the construction equipment to the management server, requests a check of a second mobile communication fee from the communication terminal when the corresponding communication terminal is used, and selects a communication method having the lowest communication fee among the first mobile communication fee, the second mobile communication fee, and a pre-stored satellite communication fee.

As described above, the present disclosure has an effect in that construction equipment is capable of adaptively changing a data communication method according to a communication environment by considering communication cost.

Further, according to the present disclosure, there is an effect in that construction equipment is capable of remotely managing the construction equipment with minimum cost by actively selecting a communication method having the lowest communication cost and transmitting information on the construction equipment by using the selected communication method.

However, an effect of the present disclosure is not limited to the aforementioned effects, and those skilled in the art will clearly understand non-mentioned other effects through the claims.

Figure 1:
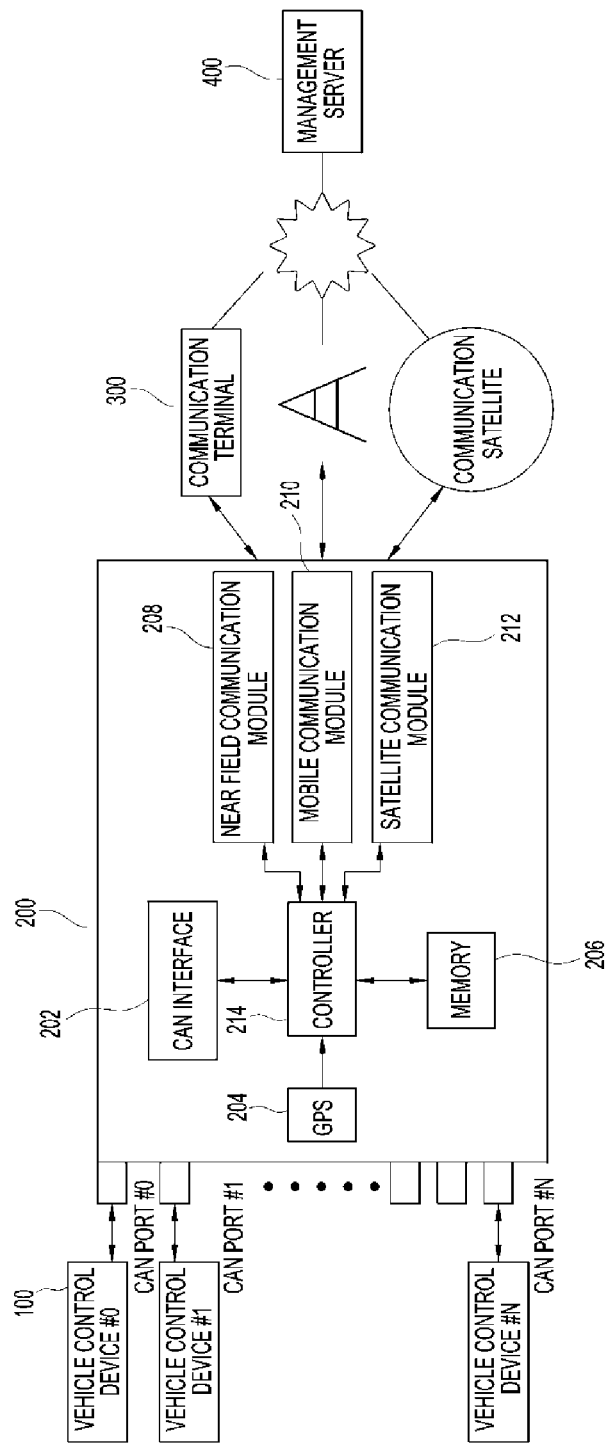
FIG. 1 is a schematic configuration diagram illustrating a remote management system of construction equipment according to an exemplary embodiment of the present disclosure.

| Description of Main Reference Numerals of Drawings | |
|---|---|
| 100: Vehicle control device | 200: Diagnostic device |
| 202: CAN interface | 204: GPS module |
| 206: Memory | 208: Near field communication module |
| 210: Mobile communication module | 212: Satellite communication module |
| 214: Controller | 300: Communication terminal |
| 400: Management server | |

DETAILED DESCRIPTION

Hereinafter, an exemplary embodiment of the present disclosure will be described in detail with reference to the accompanying drawings. Particular and specific matters described below are provided for helping general understanding of the present disclosure. In the following description of the exemplary embodiment, a detailed description of known configurations or functions incorporated herein will be omitted when it is determined that the detailed description may unnecessarily make the subject matter of the present disclosure unclear.

FIG. 1 illustrates a schematic configuration of a remote management system of construction equipment according to an exemplary embodiment of the present disclosure.

Referring to FIG. 1, a remote management system of construction equipment includes a plurality of vehicle control devices 100, a diagnostic device 200 connected with the plurality of vehicle control devices 100, a communication terminal 300 connected with the diagnostic device 200 through near field communication, a management server 400 connected with the diagnostic device 200 through a mobile communication network or a satellite communication network, and the like.

The vehicle control device 100 is a device mounted in each part of the construction equipment to control an operation and a movement, and serves to electronically control various areas of a vehicle up to a safety device and a device for convenience, as well as core areas in vehicle driving, such as an engine driving device, a brake device, and a steering device. The vehicle control devices 100 communicate with each other by internally using a protocol called a controller area network (CAN), and are connected with the diagnostic device 200 through CAN communication.

The diagnostic device 200 includes a plurality of CAN ports #0 to #N to be connected with the plurality of vehicle control devices 100, and receives state information on the vehicle control devices 100 from the vehicle control devices 100. Further, the diagnostic device 200 is connected with the surrounding communication terminal 300 through the near field communication, and transmits stored state information to the communication terminal 300. The diagnostic device 200 has a problem code value of each vehicle control device 100, so that the diagnostic device 200 may recognize whether the vehicle control devices 100 has a problem by comparing the state information on the vehicle control device 100 and the error code value.

The diagnostic device 200 according to the present disclosure may store state information on a memory 206 and transmit the state information to the surrounding communication terminal 300 through near field communication, or transmit the state information to the management server 400 through the mobile communication network or the satellite communication network.

As illustrated in FIG. 1, the diagnostic device 200 includes a CAN interface 202, a GPS module 204, the memory 206, a near field communication module 208, a mobile communication module 210, a satellite communication module 212, a controller 214, and the like. The near field communication module 208, the mobile communication module 210, and the satellite communication module 212 configure a communication module of the diagnostic device 200.

The CAN interface 202 processes the state information received from the plurality of vehicle control devices 100 through the CAN communication and transmits the processed state information to the controller 214. The GPS module 204 calculates current location information on the construction equipment while communicating with a GPS satellite.

The memory 206 stores the state information on the vehicle control devices 100 and problem code values of the vehicle control devices 100, and particularly, stores a satellite communication fee which is a fee per unit data consumed when the state information is transmitted by using the satellite communication module 212.

The near field communication module 208 is a Bluetooth or a Wi-Fi communication module, and is near-field communication connected with the surrounding communication terminal 300, and transmits the state information to the communication terminal 300 through near field communication.

The mobile communication module 210 may have a communication method, such as CDMA, GSM, and WCDMA, and may be connected to an Internet network through the mobile communication network and transmit the state information to the management server 400 accessing the Internet network.

The satellite communication module 212 may communicate with a communication satellite to be connected to the Internet network, and transmit the state information to the management server 400 accessing the Internet network.

The controller 214 serves to control each part of the diagnostic device 200. The controller 214 periodically requests the state information from the plurality of vehicle control devices 100, receives the state information, and stores the received state information in the memory 206.

The controller 214 according to the exemplary embodiment of the present disclosure selects the cheapest communication method when there is a plurality of usable communication methods, and transmits the state information by using the selected communication method. That is, the controller 214 transmits the state information to the management server 400 through the satellite communication module 212 when the satellite communication method is cheapest, the controller 214 transmits the state information to the management server 400 through the mobile communication module 210 when the method of using the mobile communication module 210 is cheapest, and the controller 214 transmits the state information to the communication terminal 300 when the method of using the surrounding communication terminal 300 is cheapest. In the method of using the communication terminal 300, the controller 214 transmits the state information to the communication terminal 300, and then the communication terminal 300 transmits the state information to the management server 400 through the mobile communication network again.

The communication terminal 300 is connected with the diagnostic device 200 using near field communication, such as Bluetooth or Wi-Fi, to receive the state information on the construction equipment from the diagnostic device 200. Further, the communication terminal 300 is requested checking a mobile communication fee from the diagnostic device 200 and checks a current location, and then calculates a fee per unit data and transmits the calculated fee to the diagnostic device 200. Further, the communication terminal 300 may set an option for a communication connection with the diagnostic device 200 through an internally installed program. An operator may select whether to allow the connection between the diagnostic device 200 and the communication terminal, a connection allowance period of time, and the like.

The communication terminal 300 may include a smart phone, a tablet PC, a notebook computer, and the like, but any type of device, which is capable of receiving the state information through the near field communication, and transmitting the received state information to the management server through the mobile communication network, and in which an application capable of calculating a mobile communication fee is installable, may be used.

The management server 400 is connected with the diagnostic device 200 through the mobile communication network or the satellite communication network, or is connected with the communication terminal 300 through the mobile communication network, and receives the state information from the diagnostic device 200 or the communication terminal 300 and store an manage the received state information. The management server 400 may analyze the state information on the construction equipment, and give command information to the diagnostic device 200 or the communication terminal 300.

Further, the management server 400 receives a request of current location information on the construction equipment and mobile communication fee check from the diagnostic device 200, calculates a fee per unit data when the mobile communication module is used, and transmits the calculated fee to the diagnostic device 200.

Figure 2:
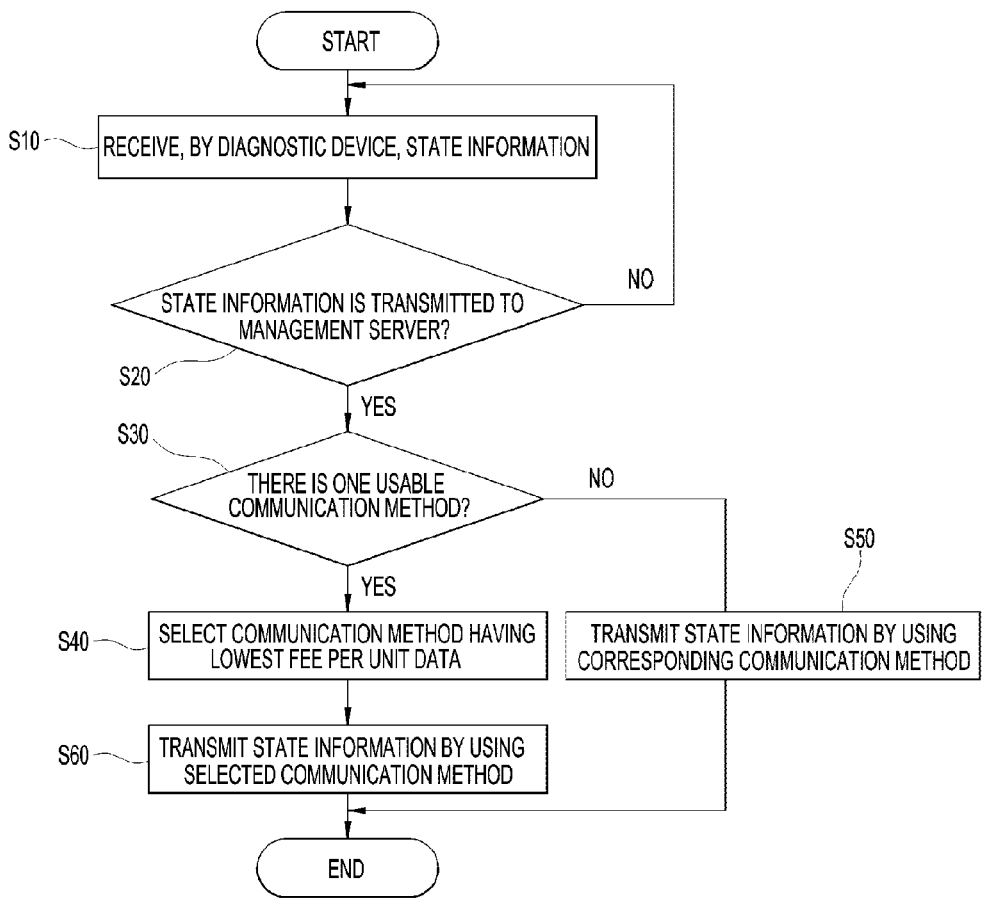
FIG. 2 is a flowchart illustrating a communication method between construction equipment and a management server according to an exemplary embodiment of the present disclosure.

FIG. 2 is a flowchart illustrating the communication method between the construction equipment and the management server according to the exemplary embodiment of the present disclosure.

Referring to FIG. 2, the diagnostic device 200 first requests state information from the vehicle control device 100 for every predetermined period of time, and receives the state information from the vehicle control device 100 through the CAN communication (S10).

Next, when the state information needs to be transmitted to the management server due to a state information error and the like (S20), the diagnostic device 200 checks whether there is a usable communication module among currently included communication modules (S30). When there is one usable communication method, the diagnostic device transmits the state information by using the corresponding communication method (S50).

When there are two or more usable communication methods, the diagnostic device selects a communication method having the lowest fee per unit data (S40), and transmits the state information by using the selected communication method (S60).

Figure 3:
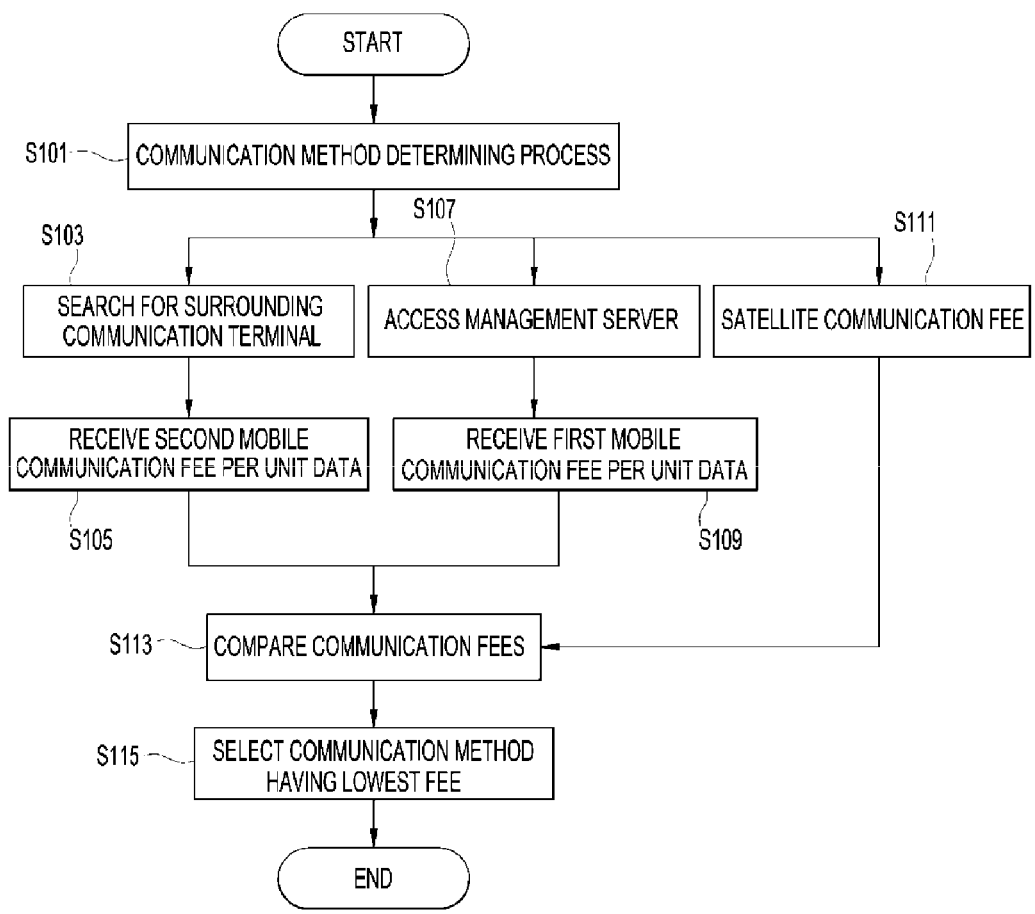
FIG. 3 is a flowchart illustrating a process of selecting a communication method by the construction equipment according to the exemplary embodiment of the present disclosure.

FIG. 3 is a flowchart illustrating a process of selecting a communication method by the construction equipment according to the exemplary embodiment of the present disclosure.

Referring to FIG. 3, when the state information needs to be transmitted, and there is a plurality of usable communication methods, a communication method determining process begins (S101).

The diagnostic device 200 accesses the management server through the mobile communication network or the satellite communication network (S107), transmits the current location information on the construction equipment to the management server, and requests a check of a first mobile communication fee, which is a fee per unit data when the diagnostic device uses the mobile communication module.

The management server checks a location of the construction equipment, calculates the fee per unit data according to the location information and a fee policy, and then transmits the first mobile communication fee to the diagnostic device. The diagnostic device receives the first mobile communication fee from the management server (S109).

Next, the diagnostic device 200 searches for a surrounding communication terminal through a near field communication network (S103), and when there is a communication connection authentication from the searched communication terminal, the diagnostic device 200 requests a check of a second mobile communication fee which is a fee per unit data when the corresponding communication terminal is used.

The communication terminal checks a current location, calculates the fee per unit data according to location information and a fee policy, and then transmits the second mobile communication fee to the diagnostic device. The diagnostic device receives the second mobile communication fee from the communication terminal (S105).

In the meantime, the satellite communication fee is generally uniform, so that the diagnostic device pre-stores the satellite communication fee (S111).

The diagnostic device compares the first mobile communication fee received from the management server, the second mobile communication fee received from the searched surrounding communication terminal, and then pre-stored satellite communication fee (S113). The diagnostic device selects the cheapest communication method (S115), and transmits the state information by using the selected communication method.

Further, since the construction equipment works while moving, a fee per unit data for each surrounding usable communication method may be changed according to a change in a location of the construction equipment. For example, a contracted data fee is cheap within a network possessed by a communication network provider, but since a charging policy is changed when the construction equipment deviates from the network of the communication network provider, a communication data fee may become expensive. Accordingly, the diagnostic device may periodically monitor location information through GPS information and a charging policy for each location of each communication network provider to repeat the communication method determining process of FIG. 2. The repetition time may be arbitrarily set when a construction equipment manufacturing company releases the construction equipment, or an operator may set the repetition time through a construction equipment operating terminal or a portable terminal.

The exemplary embodiments of the present disclosure have been described with reference to the accompanying drawings, but those skilled in the art will understand that the present disclosure may be implemented in another specific form without changing the technical spirit or an essential feature thereof.

Therefore, these above-described embodiments are provided for full understanding of the scope of the present disclosure by those skilled in the art, so that it should be understood that the present disclosure is only for illustrative purposes in all aspects and is not limited, and the present disclosure is only defined by the accompanying claims.

The invention claimed is:

1. A communication method between construction equipment and a management server, comprising:
   (i) receiving, by a diagnostic device of the construction equipment, state information from a plurality of vehicle control devices;
   (ii) checking for, by the diagnostic device, a usable communication method when the received state information is identified to be transmitted to the management server;
   (iii) when there is one usable communication method identified by the checking, transmitting, by the diagnostic device, the state information to the management server using the one usable communication method; and
   (iv) when there is a plurality of usable communication methods identified by the checking, selecting, by the diagnostic device, a communication method from the plurality of usable communication methods having the lowest fee per unit data, and transmitting the state information to the management server using the selected communication method,
   wherein the diagnostic device of the construction equipment periodically monitors respective location information and charging policies of communication network providers using the operations (i), (ii), (iii), and (iv).

2. The communication method of claim 1, wherein the diagnostic device of the construction equipment periodically compares a fee per unit data for each usable communication method, selects a communication method having the lowest fee, and performs a communication according to the selected communication method.

3. A communication method between construction equipment and a management server, comprising:
   transmitting, by a diagnostic device of the construction equipment, current location information on the construction equipment to a management server;
   requesting a check of a first mobile communication fee, which is a fee per unit data when the diagnostic device uses a mobile communications device;
   identifying, by the diagnostic device, a surrounding communication terminal;
   requesting a check of a second mobile communication fee, which is a fee per unit data when the identified surrounding communication terminal is used;
   selecting, by the diagnostic device, a communication method having the lowest communication fee among the first mobile communication fee, the second mobile communication fee, and a pre-stored satellite communication fee; and
   transmitting, by the diagnostic device, state information on the construction equipment using the selected method.

4. The communication method of claim 3, wherein the identified surrounding communication terminal sets an option for a communication connection with the diagnostic device including whether to allow a connection, a connection time, or a connection period of time, through a program installed inside the communication terminal.

5. A diagnostic device of construction equipment, comprising:
   a CAN interface configured to perform CAN communication with a plurality of vehicle control devices included in the construction equipment;
   a GPS configured to provide location information on the construction equipment; communication circuitry including a near field communication device, a mobile communications device, and a satellite communication device configured to transmit state information on the vehicle control devices to a surrounding communication terminal or a management server;
   a memory configured to store the state information received from the plurality of vehicle control devices, and a satellite communication fee when the satellite communication device is used; and
   a controller configured to:
   request the state information from the plurality of vehicle control devices;
   receive the state information; and
   transmit the received state information to the surrounding communication terminal or the management server,
   wherein the controller requests a check of a first mobile communication fee when the mobile communications device transmits current location information on the construction equipment to the management server, requests a check of a second mobile communication fee from the surrounding communication terminal when the surrounding communication terminal is used, and selects a communication method having the lowest communication fee among the first mobile communication fee, the second mobile communication fee, and a pre-stored satellite communication fee.

\* \* \* \* \*